(12) United States Patent
Becher et al.

(10) Patent No.: US 6,666,571 B2
(45) Date of Patent: Dec. 23, 2003

(54) SLIDING ROOF FOR A MOTOR VEHICLE

(75) Inventors: Thomas Becher, Rodgau (DE); Horst Böhm, Frank am Main (DE); Dieter Hinterwäller, Mainz (DE); Bardo Imgram, Seligenstadt (DE); Joachim Röder, Mühlheim (DE); Erik Roeren, Lake Orion, MI (US); Volker Sommer, Wiesbaden (DE); Kai Stehning, Usingen (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/197,638

(22) Filed: Jul. 17, 2002

(65) Prior Publication Data

US 2003/0026105 A1 Feb. 6, 2003

(30) Foreign Application Priority Data

Jul. 17, 2001 (DE) .......................... 101 34 641

(51) Int. Cl.⁷ ............................ F21V 101/00
(52) U.S. Cl. .................. 362/490; 362/493; 362/511
(58) Field of Search ................... 362/493, 490, 362/511, 84

(56) References Cited

U.S. PATENT DOCUMENTS

| 5,079,675 | A | | 1/1992 | Nakayama |
| 5,520,434 | A | | 5/1996 | Paetz et al. |
| 6,019,411 | A | * | 2/2000 | Carter ............... 296/37.7 |
| 6,331,065 | B1 | * | 12/2001 | Wims ............... 362/439 |

FOREIGN PATENT DOCUMENTS

| DE | 197 22 958 | 12/1997 |
| DE | 199 02 244 | 8/2000 |
| DE | 101 08 302 | 2/2001 |

OTHER PUBLICATIONS

German Search Reported dated Feb. 6, 2003.

* cited by examiner

*Primary Examiner*—Laura K. Tso
(74) *Attorney, Agent, or Firm*—Carlson, Gaskey & Olds

(57) ABSTRACT

A sliding roof for a motor vehicle comprises a shiftable cover arranged for opening and closing a vehicle roof and at least one electrical light source attached to the cover.

15 Claims, 6 Drawing Sheets

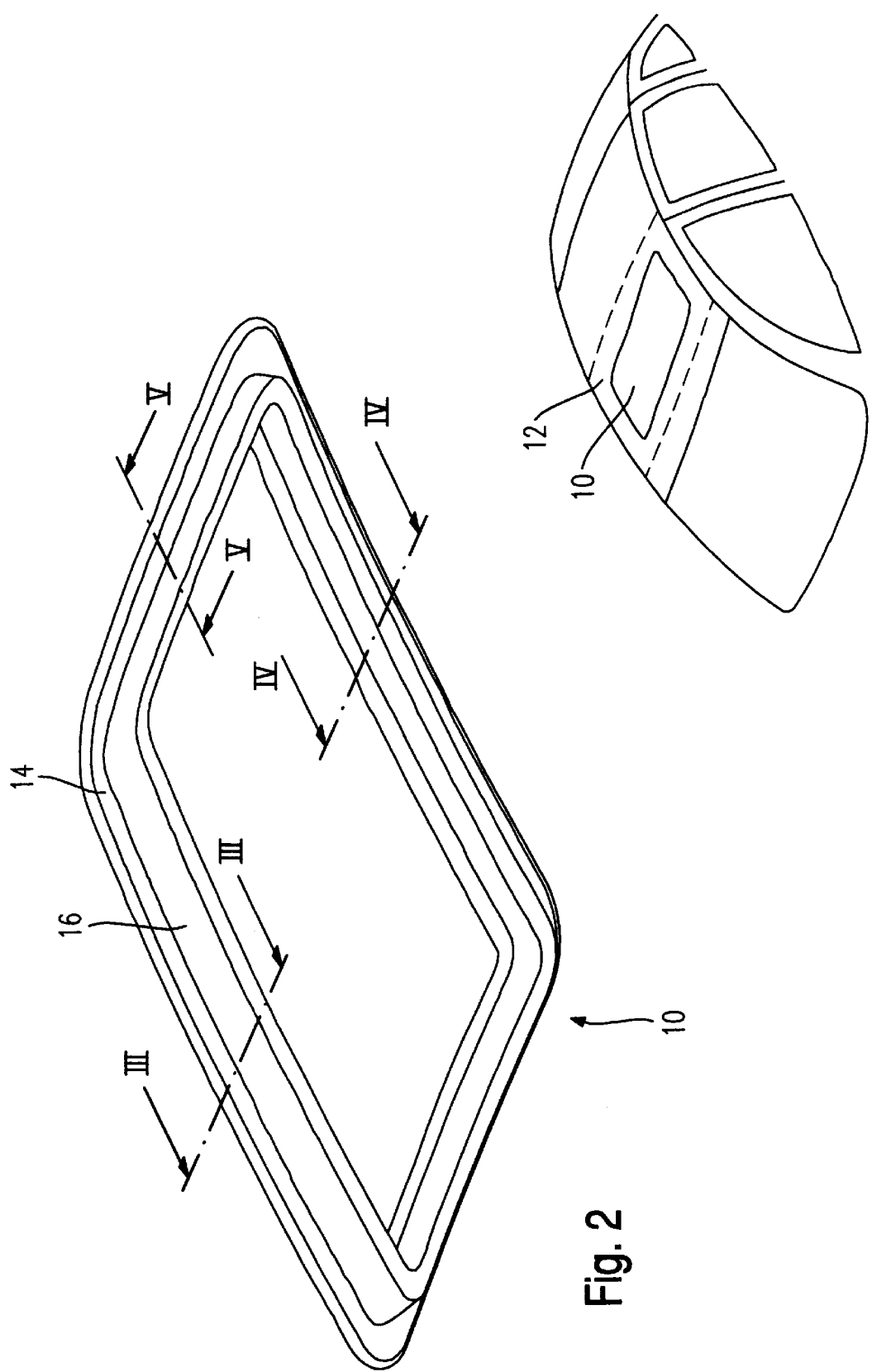

SLIDING ROOF FOR A MOTOR VEHICLE

CROSS REFERENCE TO RELATED APPLICATIONS

This application claims priority to German Patent Application Number 101 34 641.7 filed on Jul. 17, 2001.

TECHNICAL FIELD

The invention relates to a sliding roof for a motor vehicle.

BACKGROUND OF THE INVENTION

A sliding roof that comprises a shiftable cover arranged for opening and closing a vehicle roof is known from DE 199 02 244 A1. In this arrangement, a sliding headliner which is shiftable underneath the glass cover, is provided with a planar light fixture in order to provide a non-glaring interior space lighting that does not blind the driver. There is the desire to slightly illuminate the interior space during night trips, in order to better see, for example, operating elements, while the illumination must not produce reflections in the window panes and blind the driver. A sliding headliner usually is a very lightweight plate that is made of plastics or compressed fiber materials and can be inserted into an accommodation space; the plate itself and its guide are to be as light as possible and equipped as simply as possible. Due to the arrangement of a lighting device, however, the sliding headliner has to be more rigid and, thus, has a higher weight in order to avoid vibration of the lighting device.

The invention provides a sliding roof with an integrated illumination device that minimizes the tendency of the light source to vibrate and reduces the expenditure for accommodating the light source.

BRIEF SUMMARY OF THE INVENTION

According to the invention, a sliding roof for a motor vehicle comprises a shiftable cover arranged for opening and closing a vehicle roof and at least one electrical light source attached to the cover. The stable, movable cover that closes the outer skin of the vehicle is provided with a very stable guide and for its part is configured stably, so that no enhanced expenditure has to be made for reducing the tendency to vibrate. The lighting for the interior space may be set to such a low level, where appropriate, that it may remain in the ON-state during driving and gives a pleasant feel in the vehicle compartment.

According to one embodiment, the light source is a two-dimensional light source which is attached to the cover, for instance an electroluminescence light source that is often installed in digital clocks for background lighting. In U.S. Pat. No. 4,775,964, which is incorporated herein by reference, and the patent documents mentioned therein there are described such extremely thin, two-dimensional or, in other words, sheet-shaped lighting devices. Single, high-power light sources tend to be blinding or create reflections in the window panes, which is why a sheet-shaped light exit not only provides a more pleasant light, but also for a light which is more suitable for illuminating the interior space.

Further, the light source may be at least one filament bulb, an LED or a gas discharge lamp.

It is further provided for that a lightwave component extends along at least a portion of the edge of the cover and emits light preferably in a direction inwardly of the edge. Due to such arrangement of the lightwave component, the light is emitted in a horizontal plane that is submitted above the occupant and does not or only slightly radiate obliquely downwards, so that the driver will not be blinded by the light. This results in a type of indirect lighting in which spot-like sources are provided, but where the light is radiated through the one or more lightwave component(s).

The lightwave components are, for example, optical waveguides or plexiglass bodies.

According to the invention, the cover has at its inner side a foamed backing or an injection-molded backing provided on the edge of the cover. Preferably, the light source or the lightwave component may be arranged on or in the backing concerned. The foamed backing or the injection-molded backing forms, for instance, a bead-like frame on the inner side of the cover, the lateral surface area of which frame points inwards and comprises a light exit surface area. The light exit surface area may be configured as a surrounding light band or, in other words, a circumferentially extending ring-shaped light exit area, for instance by the light band or the lightwave component being laid on the inner side on the frame and embedded in the foamed or injection-molded backing.

Preferably, the light source is arranged likewise in the foamed or injection-molded backing, which can be done in a very simple manner in that an appropriate accommodation space is left empty during foaming or injection-molding of the backing.

The preferred embodiment of the invention includes a glass plate to form a glass cover.

If appropriate, the glass plate may be coated such or may be roughened on its inner side such that it has an enhanced reflectivity for light from the light source in the direction towards the interior space, as compared with a corresponding plate that is not coated or is not roughened on its inner side. In this embodiment it is considered that the light leaves the light source or the lightwave component at a location very close to the glass plate and at the edge thereof, so that the angle of incidence may be very flat with respect to the inner side of the glass plate and light is hardly reflected in downward directions.

BRIEF DESCRIPTION OF THE DRAWINGS

FIG. 1 shows a top view onto a vehicle roof with an integrated sliding roof according to the invention, FIG. 2 shows a perspective bottom view of the cover of a sliding roof according to a first embodiment;

DETAILED DESCRIPTION OF THE PREFERRED EMBODIMENTS

Figure 3:
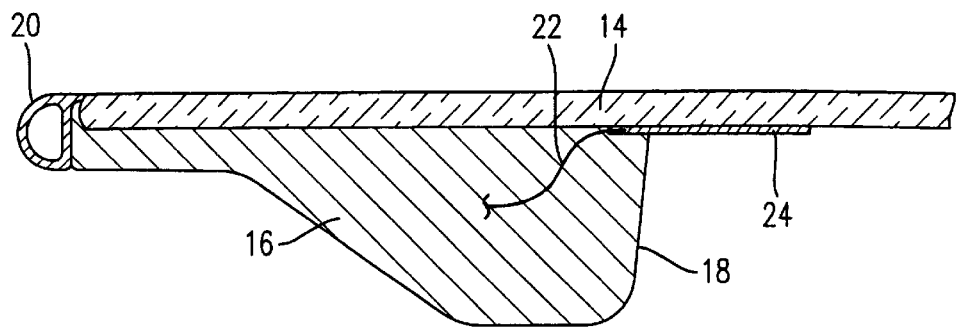
FIG. 3 shows a section through the cover edge along line III—III in FIG. 2.
Figure 4:
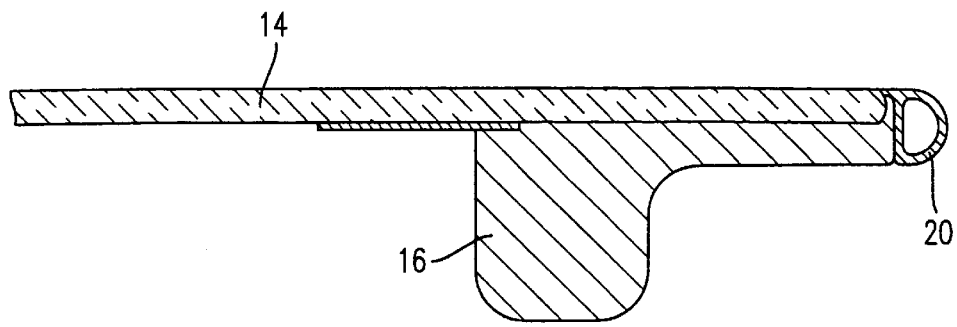
FIG. 4 shows a section through the cover edge along line IV—IV in FIG. 2.
Figure 5:
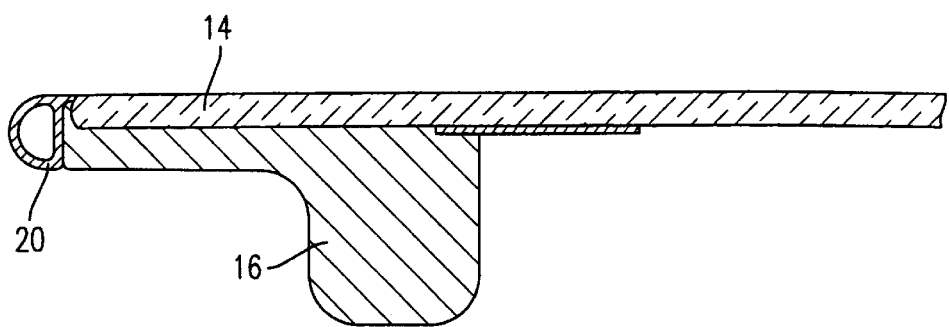
FIG. 5 shows a section through the cover edge along line V—V in FIG. 2.
Figure 6:
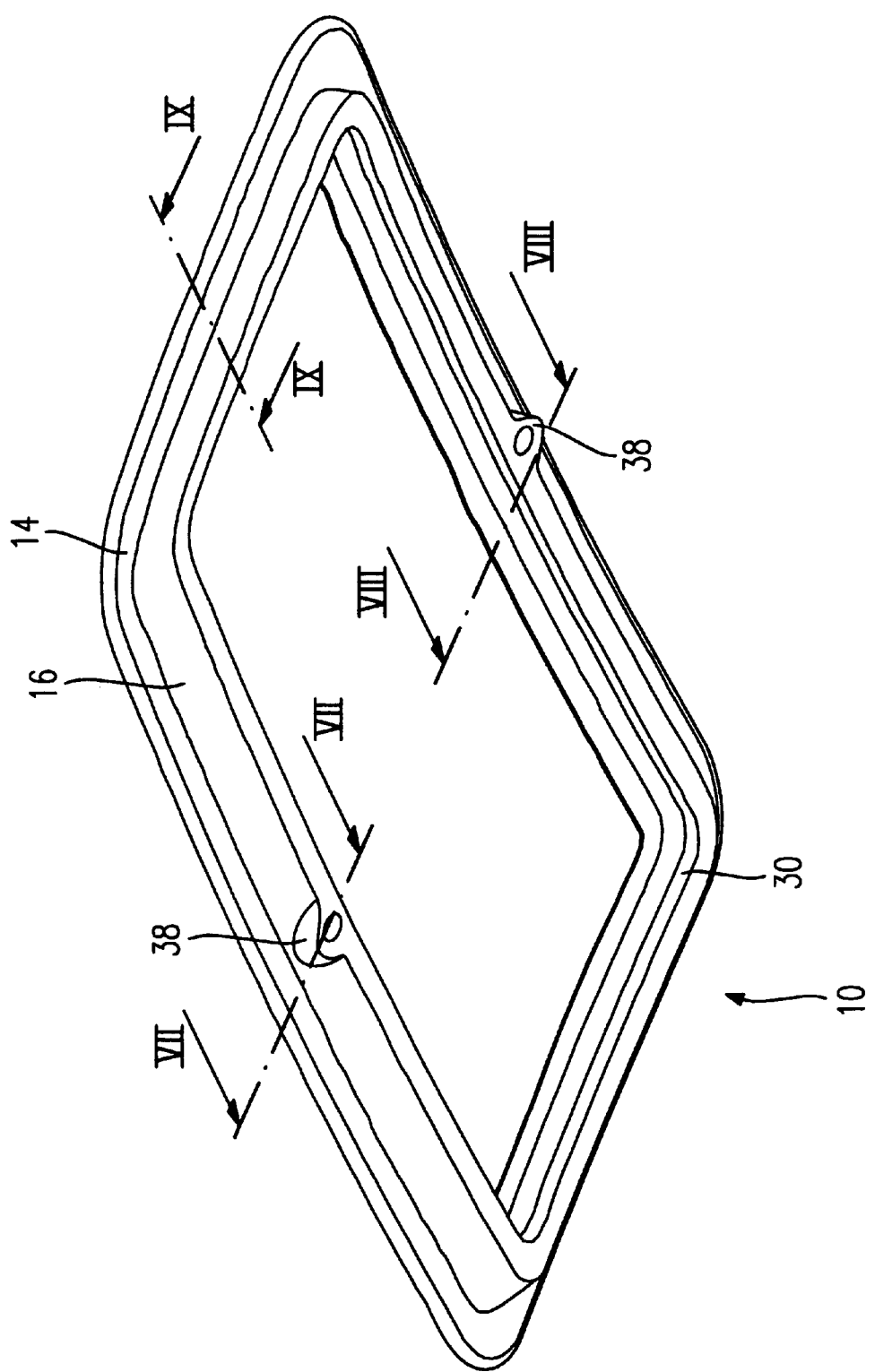
FIG. 6 shows a perspective bottom view of a cover of a sliding roof according to a second embodiment of the invention.
Figure 7:
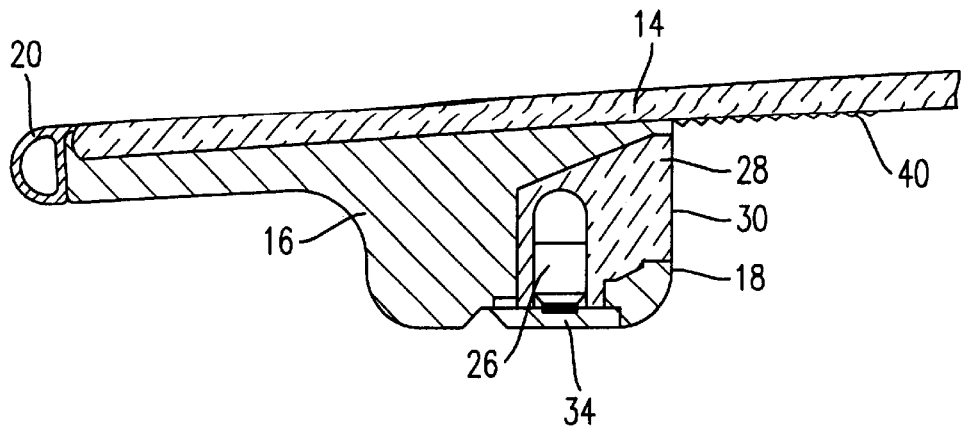
FIG. 7 shows a section through the cover edge along line VII—VII in FIG. 6.

In FIG. 1 there is shown a sliding roof of a vehicle 12, which has a shiftable cover 10 and a frame (bordered by broken lines) that surrounds the cover and has guides for the cover 10. The vehicle roof 12, to be more precise, the opening in the sliding roof can be opened or closed by opening or closing the cover 10, in order to optionally vent the vehicle interior space.

The cover shown in FIG. 2 is configured as a glass cover, comprising a glass plate 14 that is provided on the outer side and closes the outer skin of the vehicle body, the glass plate is provided on the inside with a foamed or injection-molded backing that extends along the entire edge in a continuously surrounding manner. Reference numeral 16 stands for the backing (which may either be a foamed or injection-molded backing) which forms a type of bead-like frame on the inner side and comprises a continuously surrounding surface area 18 pointing laterally inwards and extending virtually at 90° with respect to the inner side of the glass plate. The backing 16, e.g. a polyurethane foam, slightly projects with respect to the lateral circumferential edge of the glass plate 14. A hollow section seal 20 is provided at the lateral circumferential edge of the backing 16 for sealing purposes.

An electrical line 22 is embedded in the backing 16 and is guided to a two-dimensional light source 24 that annularly surrounds the edge of the glass plate 14. In this embodiment, the light source 24 is visible from the inside and is fixed to the glass plate 14 and configured as thin as a film. The light source 24 is, for example, a so-called electroluminescence light source.

The two-dimensional or sheet-shaped light source 24 is a pleasant, nonglare light source which gives a pleasant feel in the vehicle compartment. Because the light source 24 is directly adjacent to the bead-like backing 16 on the inner side, its radiation is screened off in the direction towards the windshield by the backing surface 18 so that it does not create reflections in the windshield, which would be troublesome for the driver.

The following embodiments are to some extent similar to the embodiment described so far, so that parts with equal functions will bear the reference numerals already introduced.

Figure 8:
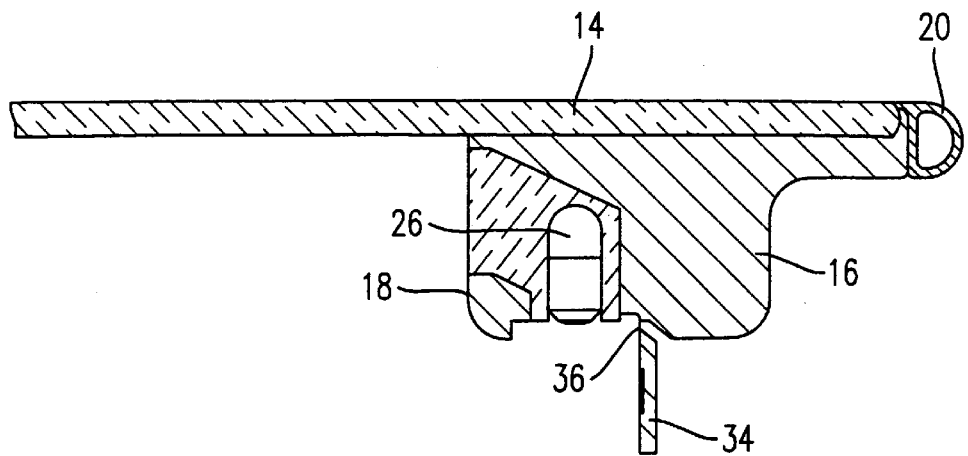
FIG. 8 shows a section through the cover edge along line VIII—VIII in FIG. 6.

In the embodiment according to FIGS. 6 to 9, two light sources 14 in the form of filament bulbs or appropriate gas discharge lamps (both being symbolized by reference numeral 26) are disposed in the backing 16. A lightwave component in the shape of an annular plexiglass body 28 is embedded in the backing 16 when attaching the glass plate 14 to the backing. The plexiglass body 28 forms part of the surface 18 pointing or facing laterally inwards, this part being indicated as light exit surface area 30 which is approximately at right angles to the glass plate 14. A closed light band is provided which, depending on the characteristics of the plexiglass body 28, radiates in an inside direction, preferably in a horizontal plane. Corresponding to the dimensions of the filament bulbs 26, there are provided accommodation chambers for the filament bulbs 26 in the plexiglass body 28. For replacing the filament bulbs 26 there is provided on flap 34 each which is connected by a film hinge 36 integrally formed with the backing 16, i.e. forms a part of the latter. In FIG. 8 the flap 34 is shown in the open state. The flap itself bears a contact (not shown) which serves to deliver power to the filament bulb 26. In the region of the filament bulbs 26, the backing 16 has appropriate bulges 38, as can be seen in FIG. 10, in order to accommodate the plexiglass body 28 that is enlarged in this region.

Figure 9:
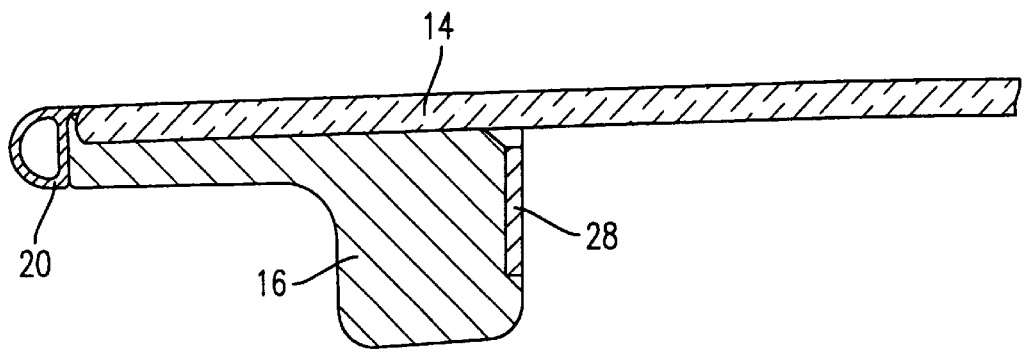
FIG. 9 shows a section through the cover edge along line IX—IX in FIG. 6.
Figure 10:
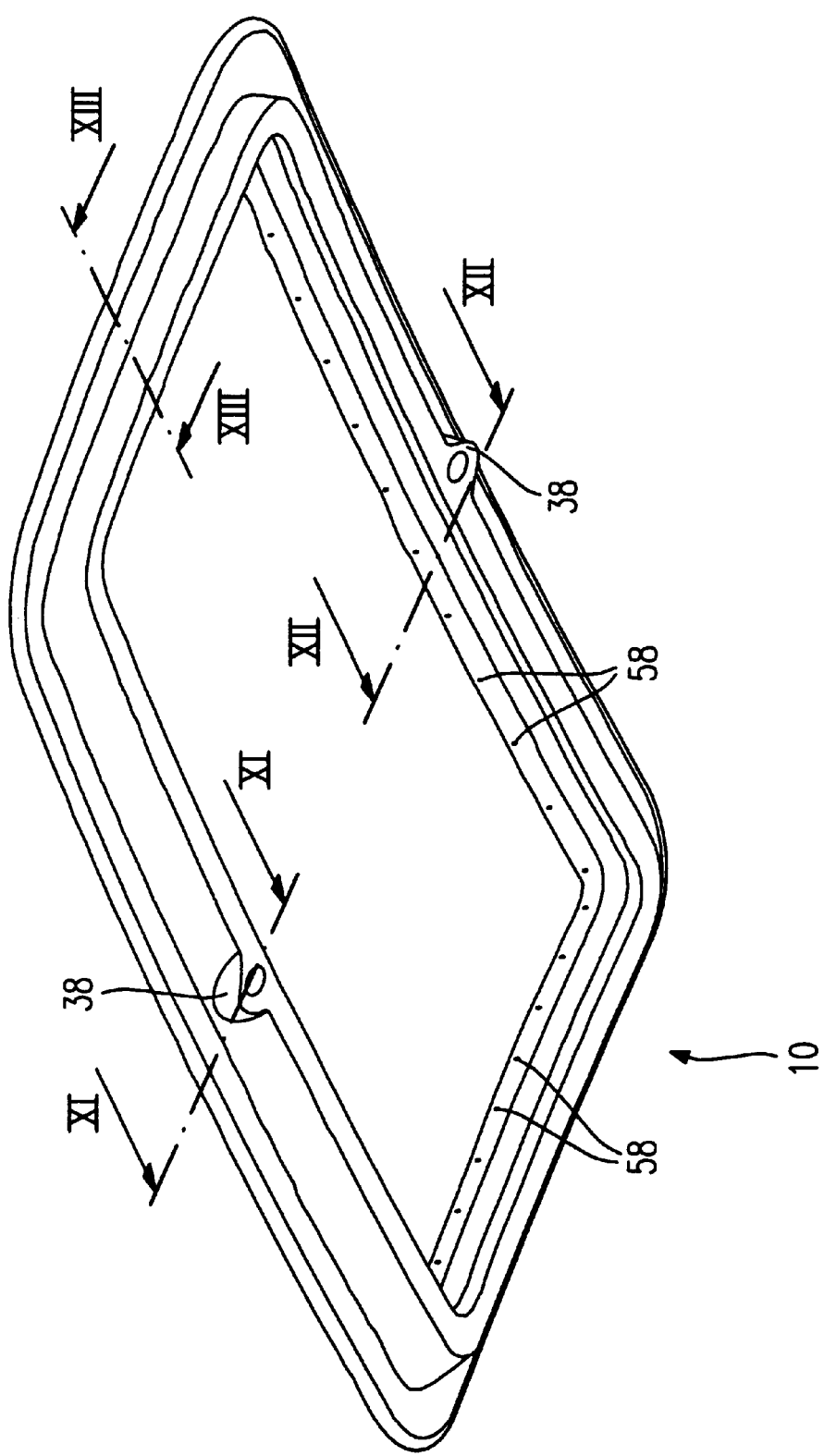
FIG. 10 shows a perspective bottom view of the cover of a sliding roof according to a third embodiment of the invention.
Figure 11:
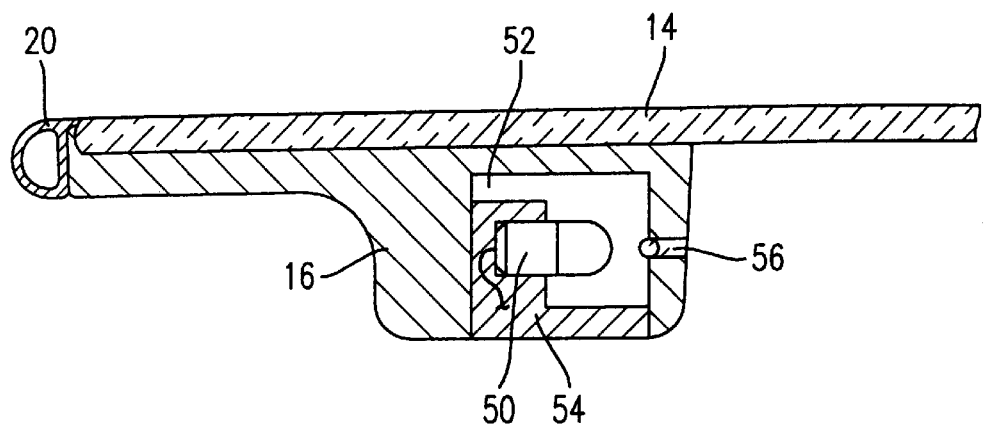
FIG. 11 shows a section through the cover edge along line XI—XI in FIG. 10.
Figure 12:
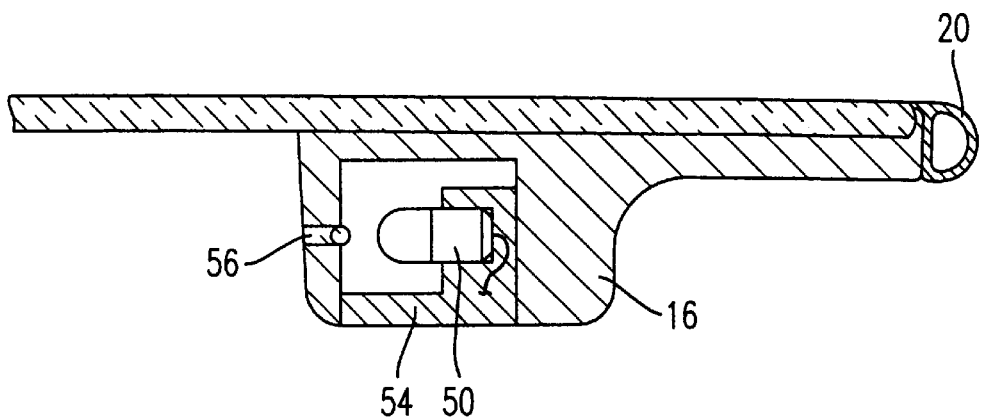
FIG. 12 shows a section through the cover edge along line XII—XII in FIG. 10.
Figure 13:
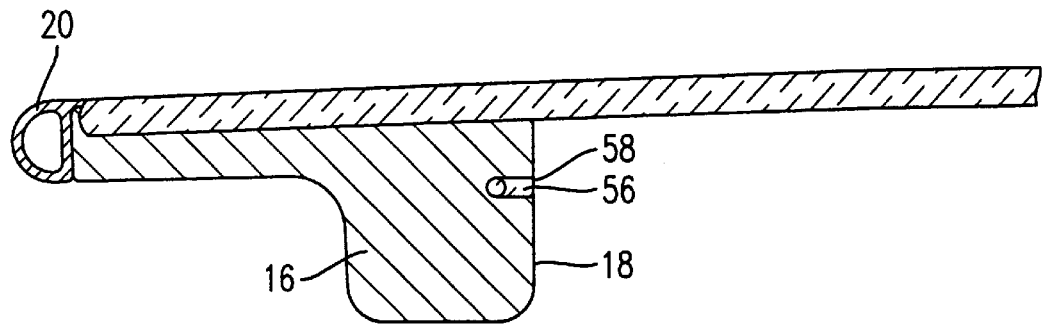
FIG. 13 shows a section through the cover edge along line XIII—XIII in FIG. 10.

In FIG. 9 it can be seen that the plexiglass body 28, at places remote from the filament bulbs 26, may be configured so as to be relatively thin.

The plexiglass body 28 may even be composed of several individual pieces which form segments of the continuous ring.

As the inner side of the glass plate 14 is also illuminated through the plexiglass body 28, the corresponding inner surface can also be employed for reflecting the incident light. For improving the reflection in downward direction, the glass plate 14 may be coated or roughened on the inner side, the corresponding coated or roughened portion being provided with reference numeral 40.

In the embodiment according to FIGS. 10 to 13, there are accommodated two LED's 50 in a cavity 52 in the bulges 38. The LED's are embedded in plastic plugs 54 which are put into the cavities 52 from below. The LED's 50 beam at a lightwave component in the from of an optical waveguide 56, which has numerous ends that form spot-like light exit surface areas 58 at the lateral surface area 18 pointing inwards. The spot-like light exit surface areas are easily seen in FIG. 10 and form a disrupted, surrounding light band. The optical waveguide 56 is embedded in the backing 16 during the foaming or injection-molded process.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A sliding roof for a motor vehicle having an outer skin, said sliding roof comprising:
    a shiftable cover that opens and fully closes an opening in the outer skin of said sliding roof; and
    at least one electrical light source being attached to said cover,
    said outer skin of said sliding roof defining a part of said outer skin of said motor vehicle.

2. The sliding roof according to claim 1, wherein said light source is a sheet-shaped light source.

3. The sliding roof according to claim 2, wherein said sheet-shaped light source is an electroluminescence light source.

4. The sliding roof for a motor vehicle, comprising:
    a shiftable cover arranged for opening and closing a vehicle roof; and
    at least one electrical light source being attached to said cover, wherein said light source is one of a filament bulb, an LED and a gas discharge lamp.

5. The sliding roof according to claim 4, wherein a lightwave component is provided that extends along at least a portion of an edge of said cover.

6. The sliding roof according to claim 5, wherein said lightwave component is one of an optical waveguide and a plexiglass body.

7. The sliding roof according to claim 5, wherein said cover has an inner side where one of a foamed backing and an injection-molded backing is provided on said edge of said cover.

8. The sliding roof according to claim 7, wherein one of said foamed backing and said injection-molded backing forms a bead-like frame on said inner side, said frame having a lateral surface area facing inwards and comprising a light exit surface area.

9. The sliding roof according to claim 8, wherein said light exit surface area is configured as a surrounding light band.

10. The sliding roof according to claim 9, wherein said light band is constituted by a lightwave component.

11. The sliding roof according to claim 7, wherein said light source is embedded in one of said foamed backing and said injection-molded backing.

12. The sliding roof according to claim 7, wherein said lightwave component is embedded in one of said foamed backing and said injection-molded backing.

13. The sliding roof for a motor vehicle, comprising:

a shiftable glass cover arranged for opening and closing a vehicle roof; and at least one electrical light source being attached to said cover.

14. The sliding roof according to claim 13, wherein said cover includes an external glass plate that is coated to have an enhanced reflectivity for light from said light source.

15. The sliding roof according to claim 13, wherein said cover includes an external glass plate that is roughened on an inner side to have an enhanced reflectivity for light from said light source.

* * * * *